United States Patent [19]

Guselnikov et al.

[11] 4,339,562
[45] Jul. 13, 1982

[54] HIGH-MOLECULAR CRYSTALLINE POLYMER WITH ALTERNATING DIMETHYLENE AND METHYL-SUBSTITUTED DISILENE UNITS IN THE MAIN CHAIN AND METHOD FOR PREPARING SAME

[76] Inventors: Leonid E. Guselnikov, Yasenevo, 4 mikroraion, 6"V", kv. 394; Jury P. Polyakov, Dmitrovskoe shosse, 96, korpus 1, kv. 55, both of Moscow; Elvira A. Volnina, ulitsa Oktyabrskaya, 1, Scherbinka Moskovskoi oblasti; Nikolai S. Nametkin, Leninsky prospekt, 13, kv. 11, Moscow, all of U.S.S.R.

[21] Appl. No.: 195,064
[22] PCT Filed: Jun. 15, 1979
[86] PCT No.: PCT/SU79/00038
  § 371 Date: Apr. 30, 1980
  § 102(e) Date: Apr. 30, 1980
[87] PCT Pub. No.: WO80/00446
  PCT Pub. Date: Mar. 20, 1980

[30] Foreign Application Priority Data

Aug. 30, 1978 [SU] U.S.S.R. .............................. 2650452

[51] Int. Cl.³ .............................................. C08G 77/06
[52] U.S. Cl. ...................................... 528/14; 528/33; 528/35
[58] Field of Search ............................. 528/35, 14, 33

[56] References Cited

U.S. PATENT DOCUMENTS 2,381,002  8/1945  Patnode ................................. 528/35
3,422,039  1/1969  Sergeevich et al. .................. 528/35

FOREIGN PATENT DOCUMENTS 44-27678  11/1969  Japan ................................. 528/35
322344    7/1970   U.S.S.R. .
216270    1/1976   U.S.S.R. .

Primary Examiner—Melvyn I. Marquis
Attorney, Agent, or Firm—Fleit & Jacobson

[57] ABSTRACT

A novel chemical compound—a high-molecular crystalline polymer with alternating dimethylene and methyl-substituted disilene units in the main chain of the formula:

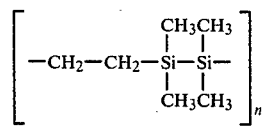

wherein n is an integer of from 800 to 1,000.

A method for preparing this polymer consists in that vapors of 1,2-bis(dimethylchlorosilyl)ethane is subjected to interaction with vapors of metallic sodium and/or potassium at a temperature within the range of from 250° to 380° C. under a pressure of 1,2-bis(dimethylchlorosilyl)ethane of from 0.1 to 10 mm Hg, followed by condensation of vapors of the resulting 1,1,2,2-tetramethyl-1,2-disilacyclobutane and polymerization thereof at a temperature within the range of from 20° to 100° C.

One of embodiments of the method for preparing this polymer comprises polymerization in bulk of 1,1,2,2-tetramethyl-1,2-disilacyclobutane at a temperature within the range of from 20° to 25° C.

9 Claims, No Drawings

HIGH-MOLECULAR CRYSTALLINE POLYMER WITH ALTERNATING DIMETHYLENE AND METHYL-SUBSTITUTED DISILENE UNITS IN THE MAIN CHAIN AND METHOD FOR PREPARING SAME

FIELD OF THE INVENTION

The present invention relates to organo-silicon polymers and, more specifically, to a novel compound, viz. a high-molecular crystalline polymer with alternating dimethylene and methyl-substituted disilene units in the main chain and to a method for preparing same.

1. Description of the Prior Art

Such polymers and methods for preparing same have not been hitherto known.

2. Disclosure of the Invention

A high-molecular crystalline polymer with alternating dimethylene and methyl-substituted disilene units in the main chain has the formula:

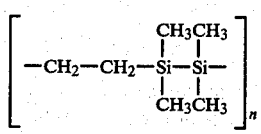

wherein n is an integer of from 800 to 1,000.

The polymer comprises a solid substance with the melting point of 113° C. and the decomposition temperature (in the air) of 240° C. The polymer is insoluble at a temperature within the range of from −70° to +55° C. in such solvents as alcohols (methanol, ethanol), ketones (acetone, methylethylketone), ethers and esters (diethyl ether, ethylacetate), halogenated hydrocarbons (carbon tetrachloride, chloroform, dichloroethane, trichloroethylene), paraffin (pentane, hexane, heptane, octane), naphthene (cyclohexane) and aromatic (benzene, toluene, o-, m-, and p-xylenes) hydrocarbons. The polymer swells in benzene, toluene, o-, m- and p-xylenes at the temperature of 55° C. and it dissolves therein with increasing temperature to give viscous solutions. The polymer is resistant against concentrated aqueous solutions of acids (H2SO4, HCl, HNO3) and alkalis (NaOH, KOH) and to the effects of light and moisture.

The polymer has a molecular weight of from 110,000 to 140,000.

The polymer is well machinable by cutting tools and mouldable by the hot-compression method. Articles manufactured from the polymer retain their shape for a long time at a temperature within the range of from −70° to +95° C. Furthermore, the polymer has good adhesive properties relative to glass.

Chemical structure and other properties of the polymer have been established through the data of its elemental composition given hereinbelow, as well as the data of spectral and physico-chemical methods of analysis.

Elemental composition (wt. percent) corresponds to that calculated for the fragment

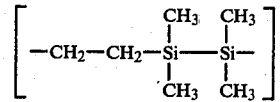

|  | C | H | Si |
|---|---|---|---|
| Found, %: | 50.01 | 11.12 | 38.76 |
| Calculated, %: | 50.00 | 11.11 | 38.89 |

In the IR spectrum of the polymer there are bands of 828 cm$^{-1}$ and 1,237 cm$^{-1}$ corresponding to valence vibrations of the group Si(CH3)2; bands 2,944; 2,895; 2,877 and 2,780 cm$^{-1}$ corresponding to valence vibrations of the group =C—H in methyl and methylene groups; bands 1,050 and 1,126 cm$^{-1}$ characteristic for the grouping =SiCH2CH2Si= and also bands 1,400, 765, 720, 690, 610 and 300 cm$^{-1}$.

In the combination scattering spectrum there is observed the band of 385 cm$^{-1}$ corresponding to valence vibrations of the bond ≡Si—Si≡.

NMR spectra of a benzene solution of the polymer contain signals: $\delta^1H_{(CH_3-Si)}$=0.275 ppm (12H, s) $\delta^1H_{CH_2}$=0.875 ppm (4H, s); $\delta^{13}C_{(CH_3-Si)}$=−0.4 ppm (4C), $\delta^{13}C_{(CH_2)}$=13.84 ppm (2C).

The ratio of intensities of the signals of protons (carbons) of methyl and methylene groups correspond to the above-given structure of a monomer unit.

The polymer crystallinity is justified by the presence of clearly pronounced reflexes in the X-ray pattern, as well as by the presence of an endothermal peak in the differential-thermal analysis curve which peak corresponds to the melting point of 113° C. The polymer molecular weight of (1.1–1.4). 10$^5$ (n=800 to 1,000) has been found through intrinsic viscosity in a solution of benzene at the temperature of 60° C. (n=0.20 to 0.27 dl/g) in a manner similar to that employed for other organosilicon polymers.

In accordance with the present invention, the method for preparing a high-molecular crystalline polymer with alternating dimethylene and methyl-substituted disilene units in the main chain comprises reacting vapours of 1,2-bis(dimethylchlorosilyl)ethane with vapours of metallic sodium and/or potassium at a temperature within the range of from 250° to 380° C. under a pressure of vapours of 1,2-bis(dimethylchlorosilyl)ethane of from 0.1 to 10 mm Hg, followed by condensation of vapours of the resulting 1,1,2,2-tetramethyl-1,2-disilacyclobutane and polymerization thereof at a temperature within the range of from 20° to 100° C.

The selected conditions of the process are optimal. Thus lowering the process temperature below 250° C. causes discontinuation of the reaction, while at a temperature above 380° C. the yield of the polymer is lowered and a noticeable gas-formation occurs.

The pressure range of from 0.1 to 10 mm Hg is defined by the partial pressure created by vapours of 1,2-bis(dimethylchlorosilyl)ethane. The use of pressures above 10 mm Hg causes clogging of the reactor with condensed products, while pressures below 0.1 mm Hg cause a lowered unit productivity and a reduced yield of the desired product.

As it has been mentioned hereinbefore, vapours of 1,2-bis(dimethylchlorosilyl)ethane are reacted with vapours of metallic sodium and/or potassium. The highest yield of the desired products is obtained in the case where a mixture of sodium and potassium is employed.

The process of polymerization of 1,1,2,2-tetramethyl-1,2-disilacyclobutane is effected at a temperature within the range of from 20° to 25° C. which is economically more efficient than at higher temperatures.

In the reaction of vapours of 1,2-bis(dimethylchlorosilyl)ethane with vapours of sodium and/or potassium under the conditions selected as above volatile products are formed which contain up to 90-95% of 1,1,2,2-tetramethyl-1,2-disilacyclobutane (the balance being impurities).

The chemical structure of 1,1,2,2-tetramethyl-1,2-disilacyclobutane has been established by mass-spectra and NMR-spectra of $^1H$, $^{13}C$ and $^{29}Si$, as well as by its specific reactivity in the reaction of oxidation with air oxygen with the formation of 1,1,3,3-tetramethyl-1,3-disila-2-oxacyclobutane having characteristics corresponding to those described in the literature and its ability of forming said polymer.

To facilitate carrying-out of the process under the selected conditions, the reaction of vapours of 1,2-bis(-dimethylchlorosilyl)ethane with vapours of sodium and/or potassium should be preferably conducted in an inert gas current under a pressure of from 50 to 760 mm Hg. This permits variation of contact time of reagents at constant velocity of supplied vapors of 1,2-bis(dimethylchlorosilyl/ethane).

As the inert gas use may be made of any inert gas, preferably nitrogen, helium, argon.

As it has been mentioned hereinabove, the reaction of vapours of 1,2-bis(dimethylchlorosilyl)ethane with vapours of sodium and/or potassium results in the formation of a monomer- 1,1,2,2-tetramethyl-1,2-disilacyclobutane which constitutes the major portion of the condensate. In addition, the condensate contains an insignificant amount of impurities which affect purity of the desired product. To remove these impurities, it is advisable that the polymerization of 1,1,2,2-tetramethyl-1,2-disilacyclobutane be carried out in the presence of an organic solvent.

As the organic solvent it is preferable to use, for example, benzene, diethyl ether, pentane, hexane, cyclohexane.

The removal of impurities from the condensate can be effected also by distillation. To this end, the condensate of 1,1,2,2-tetramethyl-1,2-disilacyclobutane is distilled in vacuum of from 1 to 15 mm Hg and at a temperature within the range of from 0° to 20° C. depending on the pressure employed prior to polymerization. As a result of distillation there can be obtained up to 90% of 1,1,2,2-tetramethyl-1,2-disilacyclobutane, since the distillation is accompanied by polymerization of the monomer in the still.

A higher yield of the distillate of 1,1,2,2-tetramethyl-1,2-disilacyclobutane is also obtained in the case of collection of the fraction of 0°-2° C./1 mm Hg, though the efficiency of purification of the condensate is decreased. For this reason, distillation of the condensate under pressure below 1 mm Hg is undesirable.

In the case of collection of the fraction 18°-20° C./15 mm Hg there is ensured the highest purity of the distillate. However, distillation of the condensate at the temperature of 20° C. and above is accompanied by a more pronounced polymerization of 1,1,2,2-tetramethyl-1,2-disilacyclobutane in the still, wherefore the yield of the distillate is lowered.

Another embodiment of the method for preparing a high-molecular crystalline polymer with alternating dimethylene and methyl-substituted disilene units in the main chain according to the present invention resides in that 1,1,2,2-tetramethyl-1,2-disilacyclobutane is polymerized in bulk at a temperature within the range of from 20° to 100° C. Polymerization at the temperature of 20° C. proceeds for two days; the rate of polymerization increases with temperature elevation and at the temperature of 100° C. the final product is obtained with 1-2 hours. The use of temperatures above 100° C. is undesirable, since it results in lowering of the polymer molecular weight.

As it has been already mentioned hereinbefore, from the economic standpoint the process of polymerization of 1,1,2,2-tetramethyl-1,2-disilacyclobutane at a temperature of from 20° to 25° C. is more efficient that at elevated temperatures.

The high-molecular crystalline polymer with alternating dimethylene and methyl-substituted disilene units in the main chain can be used for the manufacture of gasoline-resistant gaskets, protective coatings and films due to its valuable properties, namely: insolubility in hydrocarbon media, resistance in acid and alkali aqueous solution, mechanical strength, adherence to glass and plasticity. It can be successfully used instead of teflon in sealing members of gasmetering cocks employed in chromatographic systems.

The process for the production of the polymer according to the present invention can be implemented on a commercial scale. The process can be performed continuously. It does not necessitate the use of large amounts of a solvent and can be effected therewithout. The starting 1,2-bis(dimethylchlorosilyl)ethane is a readily available starting material, since it can be readily prepared from acetylene and dimethylchlorosilane—an organosilicon monomer which is a product resulting from the commercial synthesis of methylchlorosilanes.

The most preferred embodiment of the invention.

The process is simple and preferably embodied in the following manner.

Into a reactor provided with an external electric heating sodium and potassium are charged in a current of an inert gas such as argon or nitrogen. The reactor is connected with a trapping system and a vacuum pump. Into a vessel for the starting material also provided with an external electric heating 1,2-bis(dimethylchlorosilyl)ethane is charged. The vessel for the starting material is connected with the reactor by means of a pipe provided with a stop valve. When the predetermined temperature (250°-380° C.) is achieved, the concentration of vapours of alkali metals necessary for the process is obtained. Vapours of 1,2-bis(dimethylchlorosilyl)ethane are admitted into the reactor from the vessel for the starting material. The supply rate of vapours of 1,2-bis(dimethylchlorosilyl)ethane fed from the vessel for the starting material is varied by the temperature of its heating (15° to 90° C.). Pressure of the product vapours ranges from 0.1 to 10 mm Hg. A dry inert gas such as helium or nitrogen under a pressure of from 50 to 760 mm Hg is supplied into the reactor simultaneously with vapours of 1,2-bis-(dimethylchlorosilyl)ethane.

The volatile products formed in the reactor and containing 1,1,2,2-tetramethyl-1,2-disilacyclobutane (up to 90-95%) and impurities pass into a trap cooled by dry ice or liquid nitrogen with the formation of a condensate. Then the condensate is mixed with an organic solvent at a volumetric ratio between the condensate and the organic solvent of 1:5–10 and heated at a temperature of from 20° to 25° C. (heating of the condensate in the presence of an organic solvent is effected for the removal of impurities). During heating the polymer precipitates as white flakes and the impurities remain in the solution. The polymer is separated from the organic solvent by filtration. Then the polymer is washed with an organic solvent and dried in vacuum.

In another embodiment of the present invention, a high-molecular crystalline polymer with alternating dimethylene and methyl-substituted disilene units in the main chain is prepared in the following manner. A frozen ampule with 1,1,2,2-tetramethyl-1,2-disilacyclobutane is heated and kept at the selected temperature for a period of time ranging, depending on the selected temperature, from two hours to two days.

For a better understanding of the present invention some specific examples are given hereinbelow by way of illustration.

EXAMPLE 1

Into a reactor provided with an external electric heater 16 g of a mixture of sodium and potassium (in the molar ratio therebetween of 1:1) are charged in a current of dry argon. The reactor is connected with a system of traps and a vacuum pump. Into a vessel for the starting material there are charged 10.7 g of 1,2-bis(-dimethylchlorosilyl)ethane. The vessel with the starting material is connected with the reactor by means of a pipe provided with a stop cock. The contents of the reactor and the vessel for the starting material are heated. When temperature in the reactor is 250°–260° C. and temperature of 1,2-bis(dimethylchlorosilyl)ethane is 55°–60° C., the vacuum pump is switched on and the stop cock is carefully opened. The starting 1,2-bis(dimethylchlorosilyl)ethane in the form of vapours is admitted into the reactor; its vapour pressure is 1.0–1.1 mm Hg. The resulting volatile products are passed into a trap cooled with dry ice and condensed therein. Then the thus-obtained condensate is heated to a temperature of from 20° to 25° C. for 18–20 hours. The desired product is obtained as a solid white mass.

The resulting polymer weight is 4.90 g (68.0% of the theoretical yield), intrinsic viscosity (benzene solution of the polymer) $[\eta]=0.21$ dl/g (at 60° C.).

EXAMPLE 2

The polymer is prepared following the procedure described in the foregoing Example 1, except that the temperature of 1,2-bis(dimethylchlorosilyl)ethane is maintained within the range of from 30° to 35° C. and it is fed into the reactor under the pressure of its vapours of 0.50–0.55 mm Hg. To obtain the desired product with a higher degree of purity, the condensate is mixed with benzene at the volumetric ratio therebetween of 1:5, followed by heating to a temperature of from 20° to 25° C. During heating (after 6 hours) white flakes of the polymer precipitate; they are separated by filtration, washed with benzene and dried in vacuum.

The resulting polymer weight is 3.98 g (55.3% of the theoretical yield), intrinsic viscosity (benzene solution of the polymer) $[\eta]=0.23$ dl/g (at the temperature of 60° C.).

EXAMPLE 3

The polymer is prepared following the procedure described in Example 1. The difference resides in that 16 g of a mixture of sodium and potassium are charged into the reactor at the molar ratio of 2:1 between sodium and potassium. Into the vessel for the starting material there are charged 10.7 g of 1,2-bis(dimethylchlorosilyl)ethane having temperature of 15°–20° C. The pressure of vapours of 1,2-bis(dimethylchlorosilyl)ethane is equal to 0.1 mm Hg. Into the reactor heated to a temperature of from 300° to 320° C. dry helium is also fed under the pressure of 50 mm Hg.

The resulting polymer weight is 2.15 g (29.9% of the theoretical yield), intrinsic viscosity (benzene solution of the polymer) $[\eta]=0.22$ dl/g (at the temperature of 60° C.).

EXAMPLE 4

The polymer is prepared following the procedure described in Example 1 hereinbefore. The difference resides in that 16 g of a mixture of sodium and potassium are charged into the reactor at the molar ratio of 3:1 between sodium and potassium; into the vessel for the starting material there are charged 10.7 g of 1,2-bis(-dimethylchlorosilyl)ethane at a temperature of 70°–75° C. The pressure of vapours of 1,2-bis(dimethylchlorosilyl)ethane is 4.0–4.5 mm Hg; temperature in the reactor is 350°–360° C.

The removal of impurities is effected following the procedure described in Example 2, except that the condensate is heated in the presence of pentane at the volumetric ratio between the condensate and pentane equal to 1:10.

The resulting polymer weight is 4.01 g (55.8% of the theoretical yield), intrinsic viscosity (benzene solution of the polymer) $[\eta]=0.24$ dl/g (at the temperature of 60° C.).

EXAMPLE 5

The polymer is produced following the procedure described in Example 1 with the exception that 1,2-bis(-dimethylchlorosilyl)ethane having temperature of 85°–90° C. (with the pressure of its vapours of 9.5–10 mm Hg) is passed into the reactor heated to the temperature of 370°–380° C. Simultaneously with vapours of 1,2-bis(dimethylchlorosilyl)ethane fed into the reactor is dry nitrogen under pressure thereof of 200 mm Hg.

Impurities are removed following the procedure described in Example 2, except that the condensate is heated in the presence of hexane at the volumetric ratio between the condensate and hexane equal to 1:7.

The resulting polymer weight is 3.82 g (53.1% of the theoretical value), intrinsic viscosity (benzene solution of the polymer) $[\eta]$ is equal to 0.23 dl/g (at the temperature of 60° C.).

EXAMPLE 6

The polymer is prepared following the procedure described in Example 1. The distinction resides in that into the vessel for the starting material 10.7 g of 1,2-bis(-dimethylchlorosilyl)ethane are charged which is then heated to a temperature of 40°–45° C. The pressure of vapours of 1,2-bis(dimethylchlorosilyl)ethane is equal to 0.60–0.65 mm Hg. The temperature in the reactor is maintained within the range of from 370° to 380° C. Simultaneously with vapours of 1,2-bis(dimethylchlorosilyl)ethane into the reactor dry helium is fed under the pressure of 50 mm Hg. The resulting volatile products are passed into a trap cooled with liquid nitrogen.

The resulting polymer weight is 3.87 g (53.8% of the theoretical yield), intrinsic viscosity (benzene solution of the polymer) $[\eta]=0.23$ dl/g (at the temperature of 60° C.).

EXAMPLE 7

The polymer is produced following the procedure described in Example 1. The difference resides in that 16 g of a mixture of sodium and potassium are charged into the reactor at the molar ratio between sodium and potassium of 1:3; into the vessel for the starting material there are charged 10.7 g of 1,2-bis(dimethylchlorosilyl)ethane which is heated to a temperature of from 50° to 55° C. The pressure of vapours of 1,2-bis(dimethylchlorosilyl)ethane is equal to 0.85–0.90 mm Hg. The temperature in the reactor is maintained at 300°–310° C. Simultaneously with vapours of 1,2-bis(dimethylchlorosilyl)ethane dry helium is fed into the reactor under the pressure of 500 mm Hg. The resulting volatile products are passed into a trap cooled with liquid nitrogen.

The removal of impurities is effected following the procedure described in Example 2 hereinbefore, except that the condensate is heated in the presence of cyclohexane at the volume ratio between the condensate and cyclohexane equal to 1:5.

The weight of the resulting polymer is equal to 3.66 g (50.8% of the theoretical yield), intrinsic viscosity (benzene solution of the polymer) $[\eta]=0.23$ dl/g (at the temperature of 60° C.).

EXAMPLE 8

The polymer is produced following the procedure described in Example 1. The distinction resides in that into the vessel for the starting material there are charged 10.7 g of 1,2-bis(dimethylchlorosilyl)ethane which is heated to a temperature of from 60° to 65° C. The pressure of vapours of 1,2-bis(dimethylchlorosilyl)ethane is 1.8–2.0 mm Hg. The temperature in the reactor is maintained within the range of from 340° to 350° C. Simultaneously with vapours of 1,2-bis(dimethylchlorosilyl)ethane dry argon is fed into the reactor under atmospheric pressure. The removal of impurities is effected following the procedure described in Example 2, except that the condensate is heated in the presence of diethyl ether at the volumetric ratio between the condensate and diethyl ether equal to 1:5.

The weight of the resulting polymer is 4.03 g (56.2% of the theoretical yield, intrinsic viscosity (benzene solution of the polymer $[\eta]=0.26$ dl/g (at the temperature of 60° C.).

EXAMPLE 9

The interaction of vapours of 1,2-bis(dimethylchlorosilyl)ethane with vapours of sodium and potassium is effected in a tubular-type reactor connected, through an outlet pipe, with a system of traps and a vacuum pump.

Sodium and potassium (in the molar ratio of 1:3) preheated to a temperature of from 100° to 110° C. are fed into the upper part of the reactor through a nozzle at the rate of 0.1 g/min. Vapours of 1,2-bis(dimethylchlorosilyl)ethane at the temperature of 70°–75° C. under the pressure of 4.0–4.5 mm Hg are fed into the same part of the reactor. In the middle section of the reactor, wherein temperature is maintained at 370°–380° C., sodium and potassium are sublimed and their vapours of 1,2-bis(dimethylchlorosilyl)ethane. The non-volatile reaction products formed in the reactor and the unreacted sodium and potassium are condensed in the lower part of the reactor and flow down into a special vessel, while the volatile reaction products containing mainly 1,1,2,2-tetramethyl-1,2-disilacyclobutane are passed, through an outlet pipe, into a trap cooled with dry ice. As a result, a condensate is formed. The resulting condensate is distilled in vacuum (18°–20° C./15 mm Hg) to give 1,1,2,2-tetramethyl-1,2-disilacyclobutane as a transparent liquid with a geranium scent. The monomer is maintained for two days at the temperature of 25° C.

The weight of the resulting polymer is 4.63 g (64.7% of the theoretical yield), intrinsic viscosity (benzene solution of the polymer) $[\eta]=0.27$ dl/g (at the temperature of 60° C.).

EXAMPLE 10

The polymer is produced following the procedure described in the foregoing Example 9. The distinction resides in that simultaneously with sodium, potassium and vapours of 1,2-bis-(dimethylchlorosilyl)ethane dry helium is fed under atmospheric pressure.

The removal of impurities is effected following the procedure described in Example 2, except that the condensate is heated in the presence of pentane at the volumetric ratio of the condensate and pentane equal to 1:7.

The weight of the resulting polymer is 4.49 g (62.4% of the theoretical yield), intrinsic viscosity $[\eta]=0.24$ dl/g (at the temperature of 60° C.).

EXAMPLE 11

The polymer is produced following the procedure described in Example 1. The distinction resides in that the resulting condensate is subjected to distillation in vacuum (18°–20° C./15 mm Hg), whereafter purified 1,1,2,2-tetramethyl-1,2-disilacyclobutane is subjected to polymerization by heating to the temperature of 60° C.

The weight of the resulting polymer without the account of the polymer formed in the still is equal to 2.21 g (30.7% of the theoretical yield), intrinsic viscosity (benzene solution of the polymer) $[\eta]=0.22$ dl/g (at the temperature of 60° C.).

EXAMPLE 12

The polymer is produced following the procedure described in Example 1. The distinction resides in that the resulting condensate is subjected to distillation in vacuum (0°–2° C./1 mm Hg), whereafter purified 1,1,2,2-tetramethyl-1,2-disilacyclobutane is subjected to polymerization by heating to the temperature of 100° C.

The weight of the resulting polymer is 3.94 g (54.7% of the theoretical yield), intrinsic viscosity (benzene solution of the polymer) $[\eta]=0.20$ dl/g (at the temperature of 60° C.).

EXAMPLE 13

An ampule with 4.16 g of 1,1,2,2-tetramethyl-1,2-disilacyclobutane frozen in liquid nitrogen is maintained at a temperature of from 20° to 25° C. for two days. There are obtained 4.16 g of the polymer (100% of the theoretical yield), intrinsic viscosity (benzene solution of the polymer) $[\eta]$ is equal to 0.24 dl/g (at the temperature of 60° C.).

EXAMPLE 14

An ampule with 3.74 g of 1,1,2,2-tetramethyl-1,2-disilacyclobutane frozen in liquid nitrogen is heated to the temperature of 80° C. and maintained at this temperature for two hours. There are obtained 3.74 g of the polymer (100% of the theoretical yield). The intrinsic viscosity (benzene solution of the polymer) [η] 0.22 dl/g (at the temperature of 60° C.).

EXAMPLE 15

An ampule with 2.97 g of 1,1,2,2-tetramethyl-1,2-disilacyclobutane frozen in liquid nitrogen is heated to the temperature of 100° C. and maintained at this temperature for two hours. There are obtained 2.97 g of the polymer (100% of the theoretical yield). The intrinsic viscosity (benzene solution of the polymer) [η]=0.20 dl/g (at the temperature of 60° C.).

INDUSTRIAL APPLICABILITY

The high-molecular crystalline polymer with alternating dimethylene and methyl-substituted disilene units in the main chain according to the present invention is useful as a gasoline-resistant material in fuel lines of automobiles and other transport vehicles, for the manufacture of gasoline-resistant films and as protective coatings.

The method for preparing this polymer is useful in the industry of heteroorganic synthesis.

We claim:

1. A high-molecular crystalline polymer with alternating dimethylene and methyl-substituted disilene units in the main chain having the general formula:

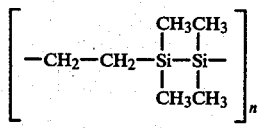

wherein n is an integer of from 800 to 1,000.

2. A method for preparing a high-molecular crystalline polymer according to claim 1, characterized in that vapours of 1,2-bis-(dimethylchlorosilyl)ethane are reacted with vapours of metallic sodium and/or potassium at a temperature within the range of from 250° to 380° C. under a pressure of vapours of 1,2-bis(dimethylchlorosilyl)ethane of from 0.1 to 10 mm Hg, followed by condensation of vapours of the resulting 1,1,2,2-tetramethyl-1,2-disilacyclobutane and polymerization thereof at a temperature within the range of from 20° to 100° C.

3. A method according to claim 2, characterized in that the polymerization of 1,1,2,2-tetramethyl-1,2-disilacyclobutane is carried out at a temperature within the range of from 20° to 25° C.

4. A method according to claims 2 and 3, characterized in that the interaction of vapours of 1,2-bis(dimethylchlorosilyl)ethane with vapours of metallic sodium and/or potassium is effected in a current of an inert gas under a pressure of said gas ranging from 50 to 760 mm Hg.

5. A method according to claims 2 and 3, characterized in that the polymerization of 1,1,2,2-tetramethyl-1,2-disilacyclobutane is carried out in the presence of an organic solvent.

6. A method according to claim 5, characterized in that as the organic solvent used is benzene, diethyl ether, pentane, hexane, cyclohexane.

7. A method according to claims 2 and 3, characterized in that the condensate of vapours of 1,1,2,2-tetramethyl-1,2-disilacyclobutane is subjected to distillation in vacuum under a pressure of from 1 to 15 mm Hg and at a temperature within the range of from 0° to 20° C.

8. A method for preparing a high-molecular crystalline polymer according to claim 1, characterized in that 1,1,2,2-tetramethyl-1,2-disilacyclobutane is polymerized in bulk at a temperature within the range of from 20° to 100° C.

9. A method according to claim 8, characterized in that 1,1,2,2-tetramethyl-1,2-disilacyclobutane is polymerized in bulk at a temperature within the range of from 20° to 25° C.

* * * * *